United States Patent [19]

Massage

[11] 3,837,215
[45] Sept. 24, 1974

[54] METHOD AND APPARATUS FOR TESTING SEALED CONTAINERS

[76] Inventor: Thomas J. Massage, One Curran Ln., Huntington, Conn. 06484

[22] Filed: May 21, 1973

[21] Appl. No.: 362,487

[52] U.S. Cl................................. 73/45.4, 73/49.3
[51] Int. Cl. ............................................ G01m 3/36
[58] Field of Search ......... 73/40, 41, 45, 45.4, 49.2, 73/49.3, 52

[56] References Cited
UNITED STATES PATENTS
3,751,972   8/1973   Haas .................................... 73/45.4

*Primary Examiner*—S. Clement Swisher
*Attorney, Agent, or Firm*—Buckles and Bramblett

[57] ABSTRACT

Method and apparatus for automatically non-destructively testing and classifying sealed containers. The containers are passed through a sealed vacuum or pressure chamber and expand or contract because of differential pressure acting on the container walls. The magnitude of the leak rate is computed by a central programming unit through a series of measurements, error corrections, and computations of container wall travel and velocity of wall travel. Each container is classified by the magnitude of its leak rate in comparison with operator programmed accept/reject limits. Multiple sensors are used simultaneously in the chamber during each test cycle to achieve efficient economic use of the high speed data processing electronics.

10 Claims, 13 Drawing Figures

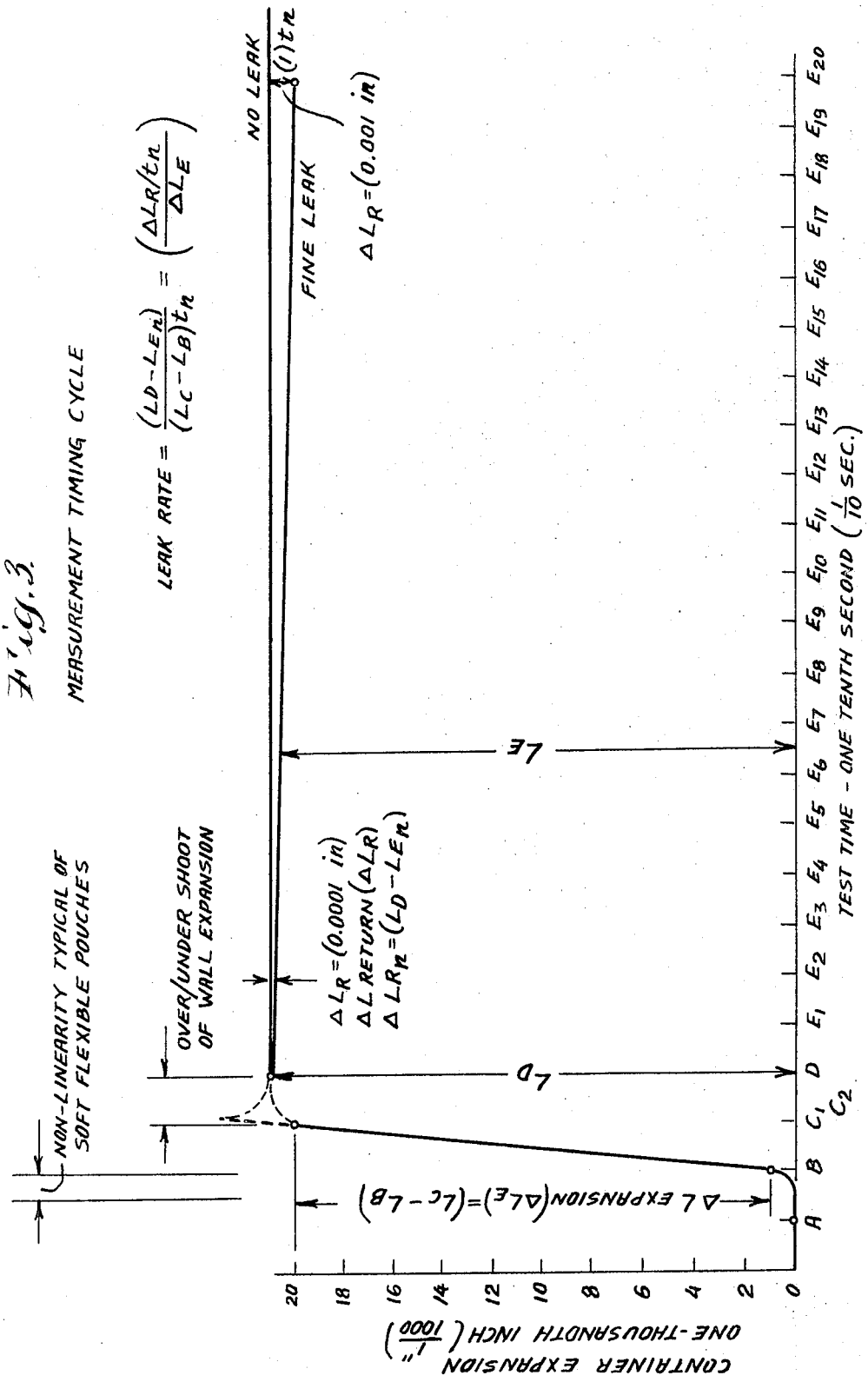

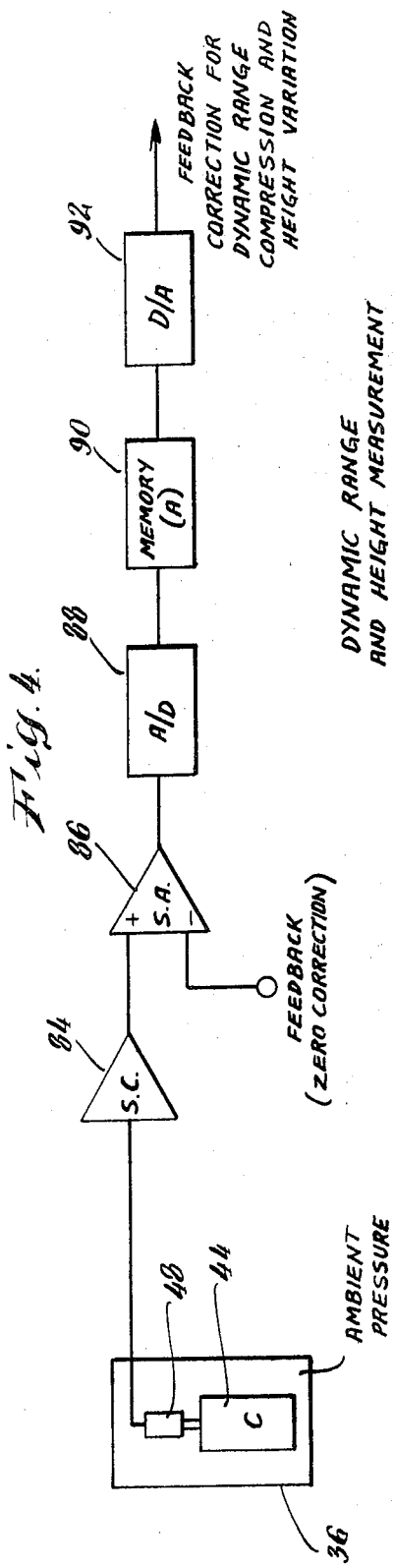
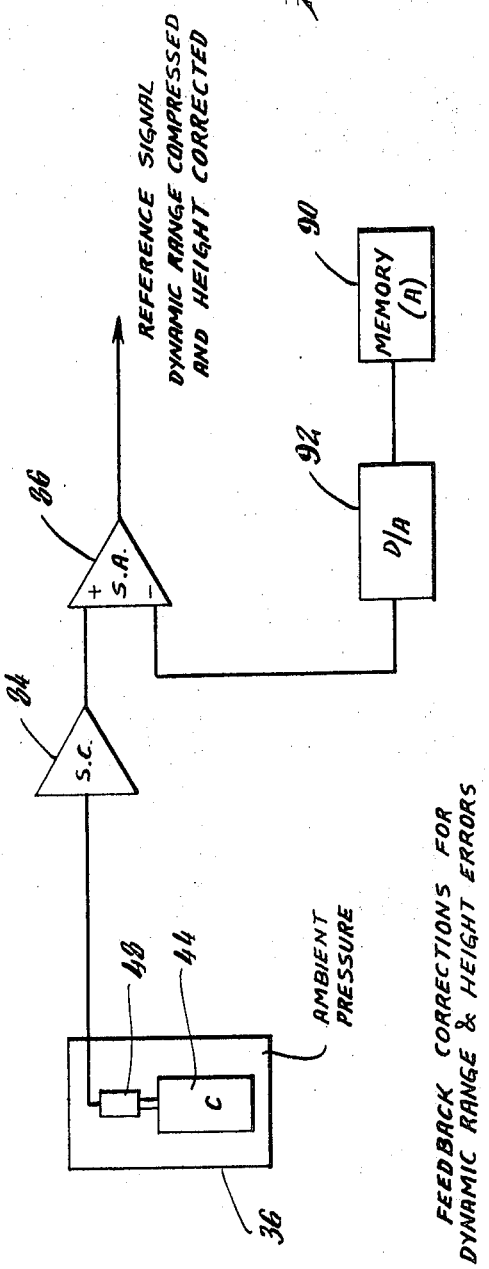

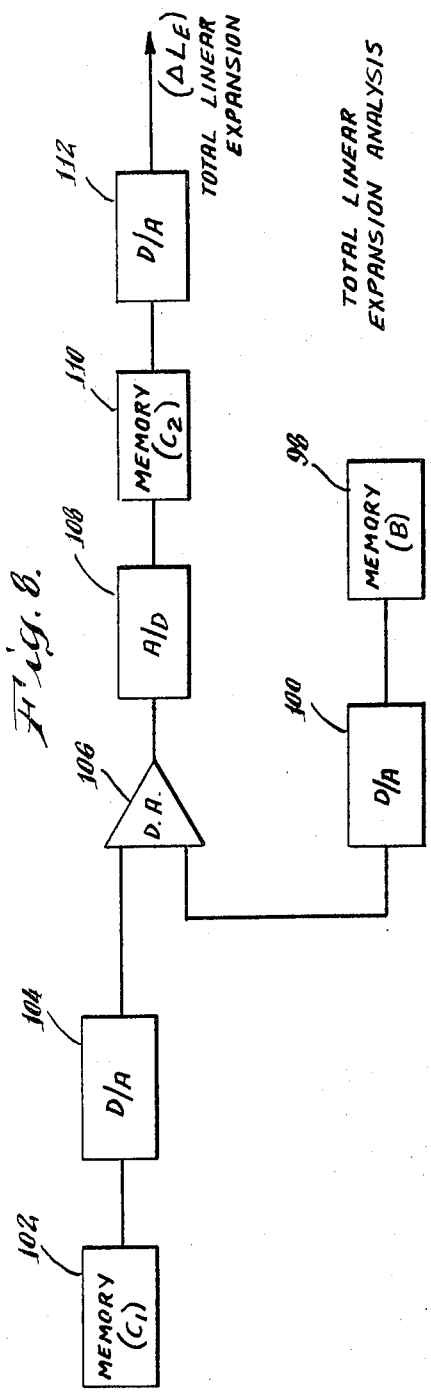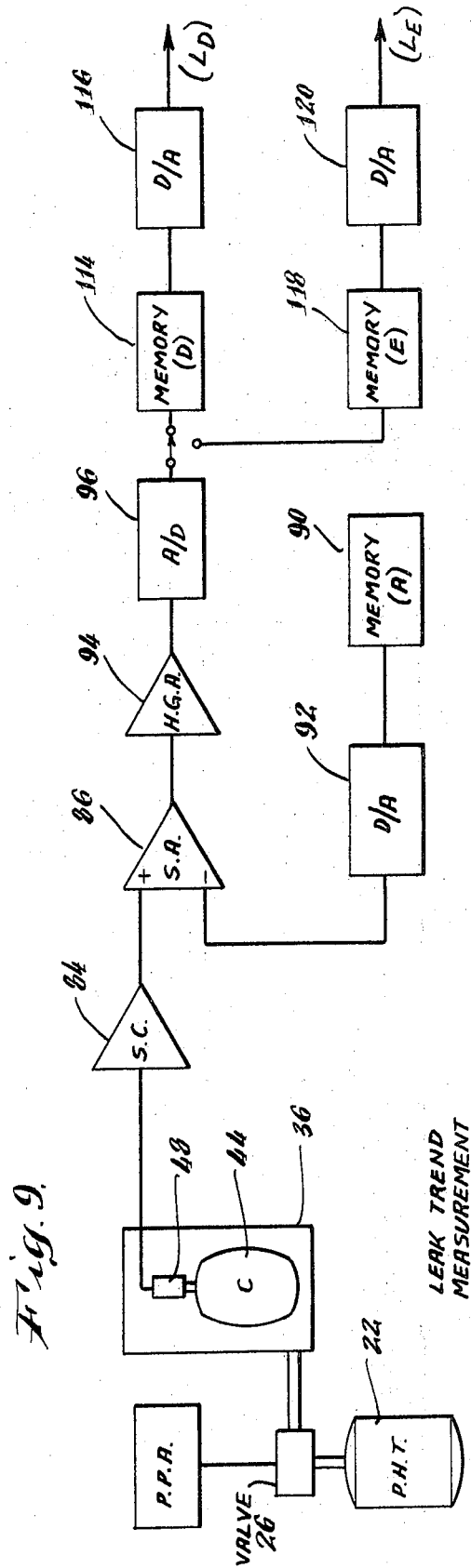

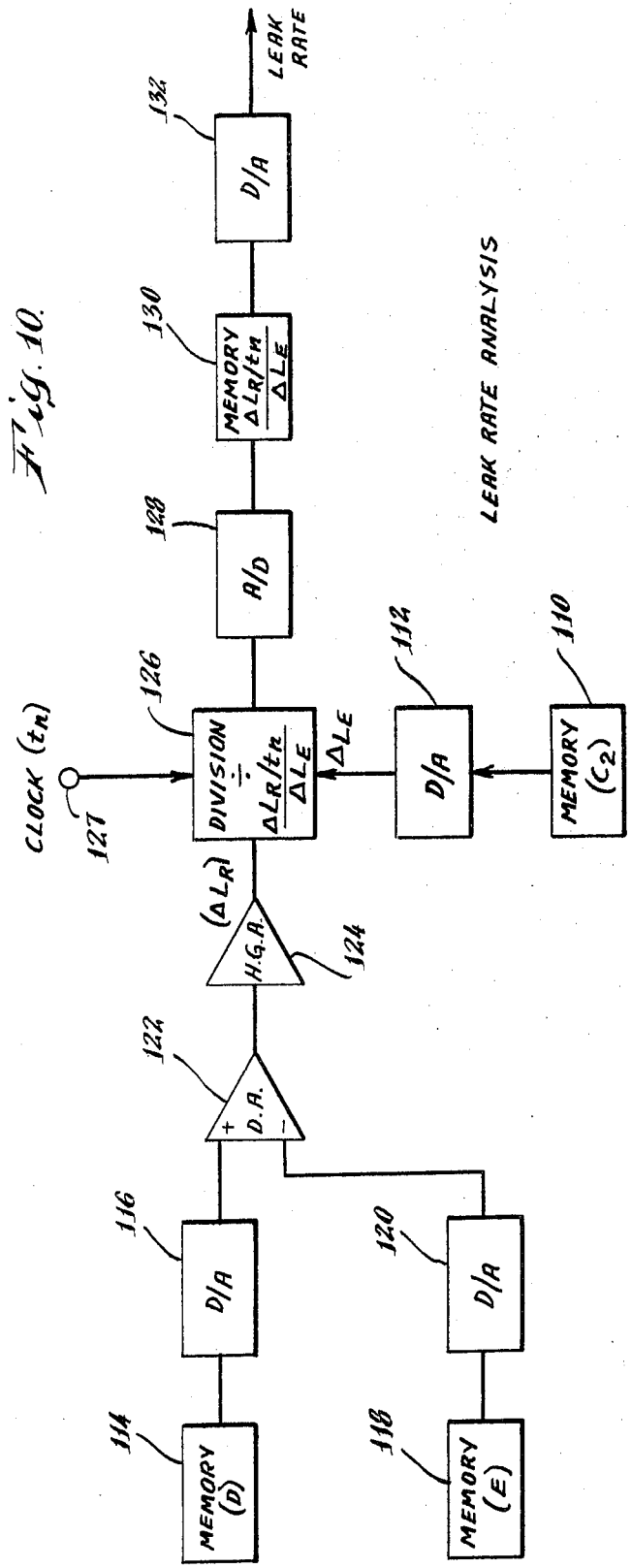

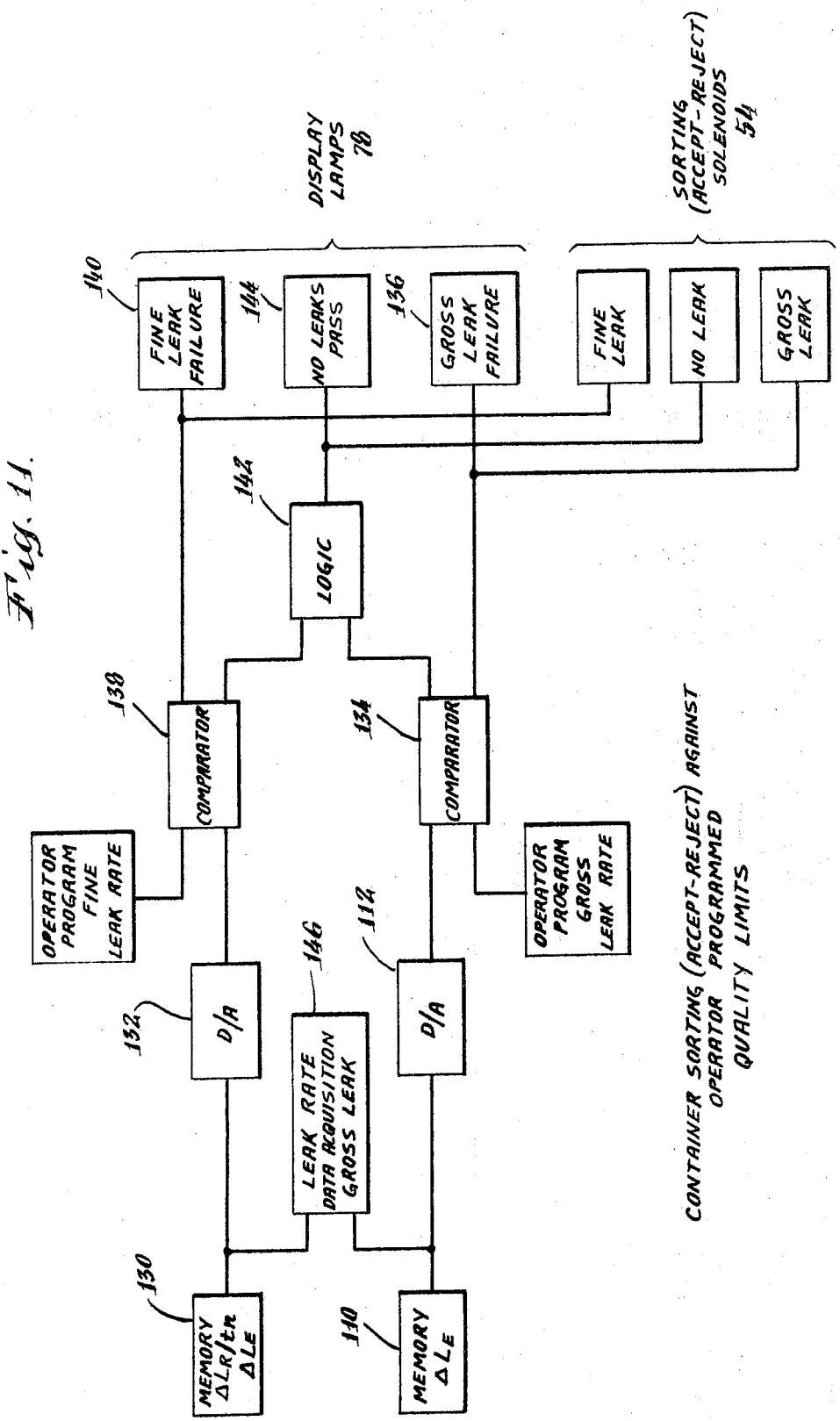

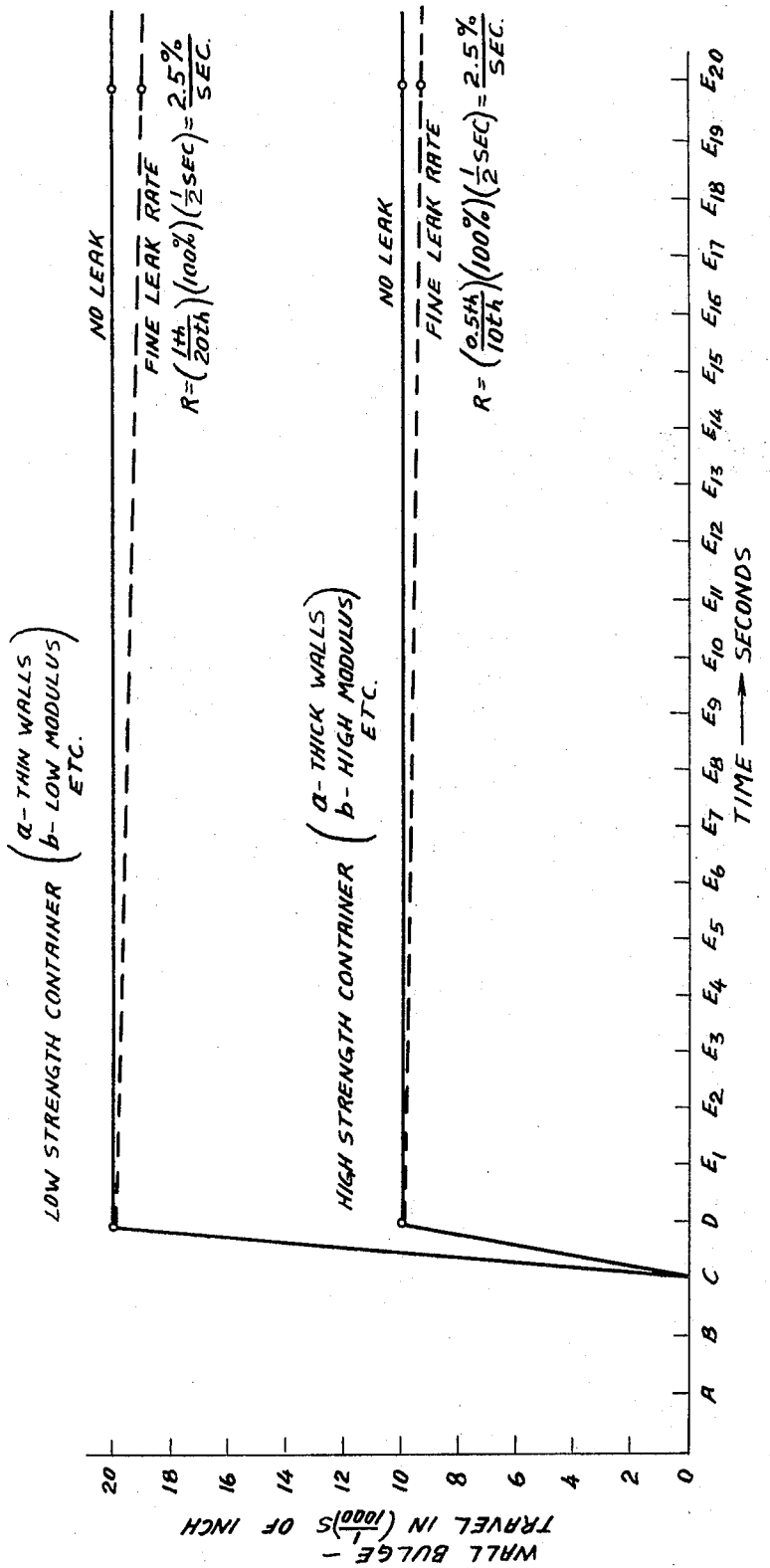

METHOD AND APPARATUS FOR TESTING SEALED CONTAINERS

BACKGROUND OF THE INVENTION

The principles of the invention described herein have application in high speed in-process quality control leak testing of sealed containers for perishables such as food, drugs, or other materials that must be sealed from contaminants. Since the degree of integrity required in the seal of each container differs for each application, an ideal testing system must provide a means of sorting sealed containers based on the acceptable limits for that package family. Furthermore, the system must have the capability of handling various form factors, such as plastic containers (milk, toothpaste, etc.), foil packs (snack packs, foods), metal cans (soup, beer, etc.), and plastic bags. From a manufacturing viewpoint, the ideal system would measure the rate of leak in units that can be easily programmed by an operator on a test console. Furthermore, this testing and sorting should be done automatically on a 100% inspection basis of all packages at high speed (typically, faster than 300 containers a minute). Finally, it is imperative that this equipment be capable of performing these measurements and sorting without damage to the sealed container and its contents.

Prior art leak testing systems operate primarily on the trace gas principle or the bulging wall principle, in which case the container is placed in an evacuated chamber. Neither are satisfactory for high speed in-process quality control leak testing on a non-destructive basis. The first method is limited to very slow speed operation. The second method does not actually measure leak rate and can be easily fooled by normal container variables such as wall thickness, internal container pressure, strength of container, etc. These variables are not under control of the testing machine but are controlled by package design and sealing machinery. In a system described in U.S. Pat. No. 1,825,699 of Landrum and a similar system described in U.S. Pat. No. 3,343,404 of LaRosa et al, container walls are caused to bulge when subjected to externally reduced pressure. Since the amount of wall bulge is directly related to wall thickness, modulus of elasticity, internal container pressure, external container pressure, area of the wall, wall contour markings, uniformity, etc., it follows that a container with thin walls will expand more than one with thick walls. If both containers have the same leak rate, the thin wall container will travel much further. Any attempt to compensate by adjusting the sensing switch at a point halfway between the travel range limits of the thin wall versus thick wall container results in a serious compromise of classification, accuracy, and capability, causing the system to reject good units or accept bad units. Systems that operate on the bulge principle are useful only if the containers and their variables characteristics are very consistent from unit to unit so that single point measurement is not confused. Furthermore, systems operated on the bulge principle can neither compensate for container variables nor generate specific magnitude of leak rate data for each container. Especially troublesome is the fact that there is no means for compensating for internal pressure variations. If containers with random internal pressures are passed through this type of measurement system, the variations in differential pressure will bulge the walls of each container differently and confuse the sensing switch. Furthermore, all containers have height variations that must be compensated and even the system described in the LaRosa patent can only effectively compensate for single containers on a one at a time basis. It would be of little value for multiple containers in the same test chamber because of the different starting position for each container on the test stand.

It is noted in the Landrum patent that the expansion of a container under vacuum will remain fixed if the container does not leak. If it does leak, the expansion will begin to creep back toward the original starting point. The Landrum patent discloses that a sensor can be adjusted to indicate if expansion is large enough and if it is sustained over a preset time period. Of course, no expansion would mean a gross leak. In theory this principle is sound, but in practice has been of little commercial value because of a number of parameters that degrade the accuracy of measurement and speed of the system. For example:

1. Variations in wall thickness. If all were good, perfectly sealed units, then each would expand a different amount and confuse the set point of the indicating device. As a matter of fact, the good, very stiff, rigid and properly sealed container may not expand as much as a weak container and therefore be rejected by a system operating on this principle.
2. Variations in internal container pressure.
3. Variations in strength of containers due to different modulus of elasticity, heat treatment, etc.
4. Variations in strength caused by contour marking stamped on the surface of the container and variations caused by impact on the contour marking dies.
5. Variations in the fill level of the internal contents of the container.
6. Variations in the size and shape or volume of the container.
7. Variations due to temperature changes.
8. Variations due to height differences and starting points of the measurement.
9. Inaccuracies of the container position with respect to the sensor measurement position.
10. Container flatness and uniformity.
11. The wide dynamic range of measurements that must be made because of all of the previous variations as well as the expansion and contraction differences. In order to get very high measurement speed together with accuracy, very high amplification is required. At the same time, however, in order to handle the wide dynamic range of signals resulting from these containers variation parameters, very low amplification is required.

In addition to the LaRosa and Landum patents previously cited, other U.S. patents representative of the prior art are:

U.S. Pat. No. 3,027,753 Harder Jr.
U.S. Pat. No. 3,091,114 Webster
U.S. Pat. No. 3,591,944 Wilcox Accordingly, it is a primary object of the present invention to provide method and apparatus for testing sealed containers for leaks by external package analysis in-process, on line, and without requiring that the sealed container be opened, damaged, or permanently distorted.

Another object is to provide such method and apparatus which is substantially independent of process operating variables such as container shape, wall thickness variations, internal pressurization, reference position, or level of fill material.

Another object is to provide such method and apparatus which permits operator programming of acceptable leak rate for the accept/reject sorting process.

Another object is to provide such method and apparatus which eliminates the requirement for precision positioning mechanisms within the test chamber or the accuracy of pressure within the test chambers.

Another object is to provide leak magnitude data in addition to accept/reject data for better statistical history of packaging efficiency.

The manner in which the foregoing objectives are achieved will be described with reference to the following detailed description and claims.

SUMMARY OF THE INVENTION

Method and apparatus for testing a sealed container for leaks comprising placing the sealed container within a test chamber and changing the pressure within the test chamber over a first time period. A physical dimension of the container is measured at the end of the first time period and a first output signal proportional thereto is produced. The same physical dimension is measured at the end of a second time period and a second output signal which is proportional thereto is produced. The difference between the first and second output signals is measured and a corresponding differential signal is produced. The rate of change of the differential signal is measured and a third output signal proportional thereto is produced to indicate the leak rate of the sealed container.

BRIEF DESCRIPTION OF THE DRAWINGS

With particular reference to the drawings:

FIG. 3 is a graph useful in explaining the operation of the invention;

FIGS. 4-11 are schematic diagrams illustrating various steps in leak testing of a container; and FIG. 12 is a graph illustrating the results obtained by this invention in testing both low and high strength containers.

DESCRIPTION OF THE PREFERRED EMBODIMENTS

Figure 1A:
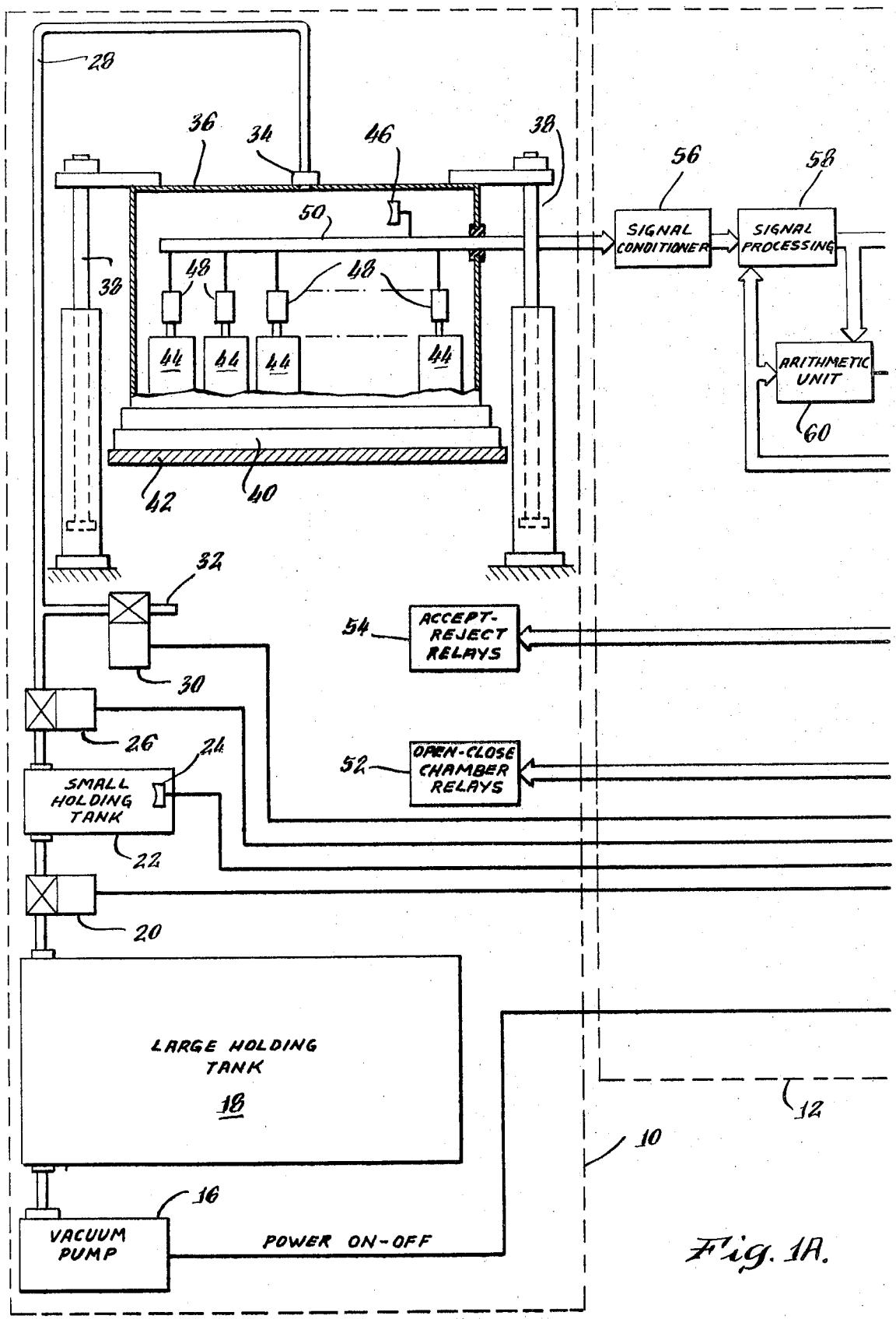
FIGS. 1A, 1B comprise a schematic diagram of the overall apparatus of the invention.
Figure 1B:
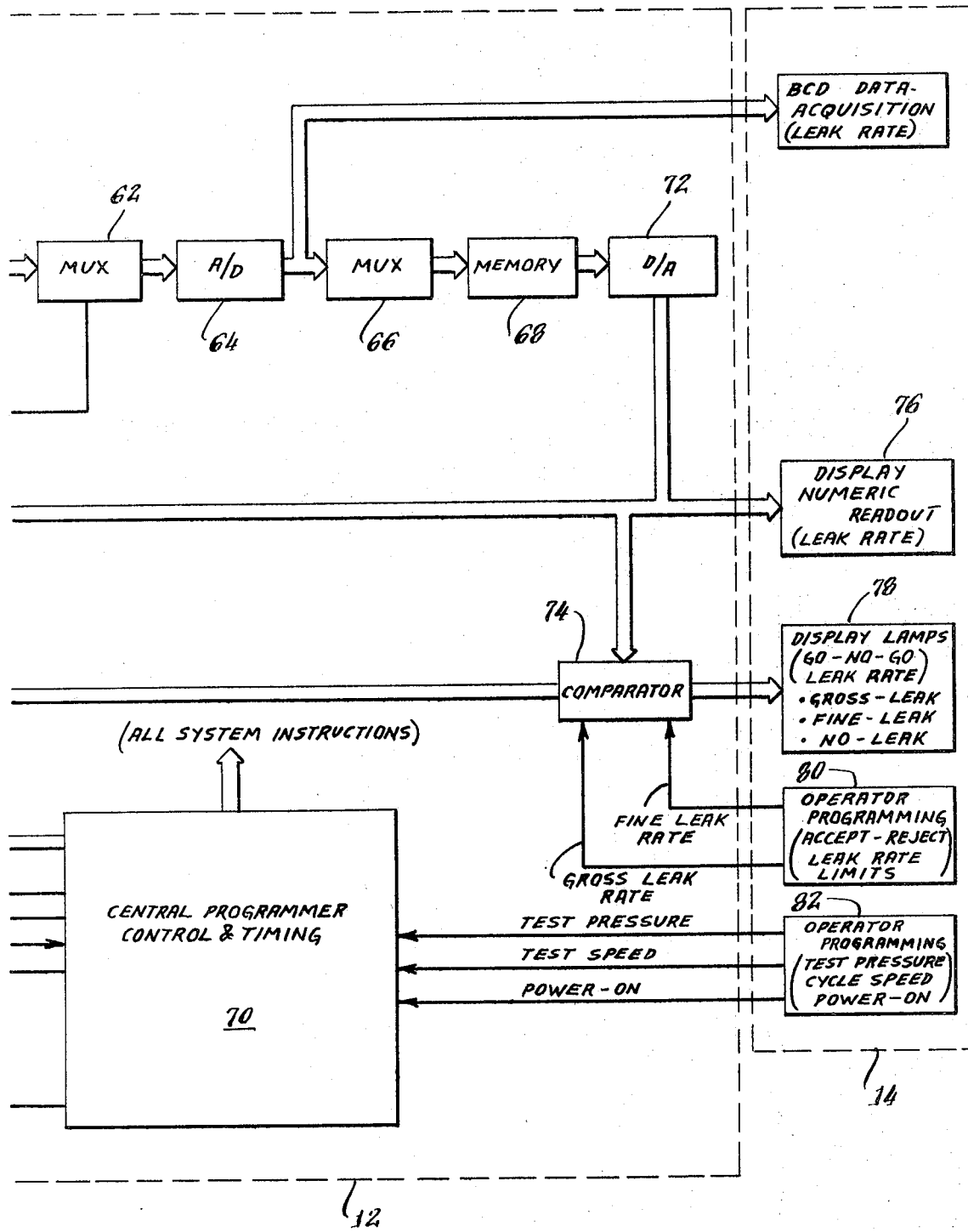
Figure 2:
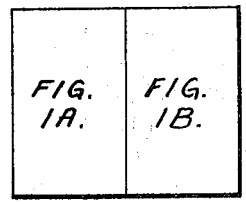
FIG. 2 illustrates the relationship between FIGS. 1A, 1B.

FIGS. 1A, 1B illustrate the three major subassemblies of this invention — namely, a test stand 10, a central programming unit 12, and an operator's console 14. Although the system of this invention will test containers under either vacuum or pressure in substantially the same manner, a vacuum system will be described below.

The test stand 10 includes a vacuum pump 16 which is connected to evacuate a relatively large holding tank 18. The large holding tank is connected by suitable piping through a solenoid valve 20 to a small holding tank 22. The small holding tank includes a pressure sensor 24 and is connected through a solenoid valve 26 to an exhaust line 28. Exhaust line 28 is connected through a solenoid valve 30 to an air bleed port 32.

The exhaust line 28 is connected by means of a suitable fitting 34 to a vacuum chamber 36 which may be raised or lowered by any suitable means such as hydraulic pistons 38. The bottom of vacuum chamber 36 carries a gasket 40 which makes sealing engagement with a conveyor 42 when the chamber is in its lowered position. The conveyor 42 carries containers 44 to be tested.

Mounted within the chamber 36 is a pressure sensor 46 and a plurality of position sensors 48, one for each container to be tested. Various types of position sensors may be employed with this invention and one which has been found useful is the linear variable differential transformer. However, various other type sensors can also be used such as proximity and optoelectronic transducers. The outputs of the sensors 46, 48 are connected to a suitable cable 50. Also contained within the test stand are relays 52 for opening and closing the chamber and relays 54 for accepting or rejecting containers.

Since electronic measurement instrumentation is many orders of magnitude faster than pneumatic and hydraulic equipment, many containers are handled simultaneously during one cycle by using multiple sensors. The treatment of the signal received from a single sensor will be described in more detail below with particular reference to FIGS. 3-11. Therefore the block circuit diagram contained in FIGS. 1A, 1B is somewhat generalized in nature. It indicates that the central programmer unit 12 includes signal conditioner circuit 56 which thereafter supplies the signal to signal processing circuitry 58. The process signal is supplied to an arithmetic unit 60. The separate signals are then multiplexed at 62 and supplied to a common analog/digital converter 64. The digitized signals are then multiplexed at 66 and transferred to a memory bank 68. The signals are held in the memory bank 68 until they are called for by a central programmer control 70 which also issues all other required system instructions. Output from the memory bank passes through a digital/analog converter 72 to a comparator 74. The same output controls a numeric readout display 76 contained in the operator's console 14. The same console includes display lamps 78 actuated by the comparator 74. A programming circuit 80 is provided for setting the leak rate limits into comparator 74, and a program circuit 82 for instructing the central programmer control 70 as to the desired test pressure, test speed, and power on time.

OPERATION

The mechanical operation of the apparatus illustrated in FIGS. 1A, 1B will now be described by reference to those figures. The vacuum pump 16 will receive power on instructions from the central programmer control 70. The vacuum pump 16 will thereupon evacuate the large holding tank 18 while solenoid valve 20 remains closed. This permits the vacuum pump 16 to run continuously and store a large volume reservoir of vacuum without evacuating the small holding tank 22. Meanwhile, solenoid valve 26 is closed and 30 opened, thereby permitting ambient pressure to enter the test chamber.

The central programmer will instruct the chamber relays 52 and hydraulic pistons 38 on test chamber 36 to raise the chamber. Thereafter, the conveyor 42 will route the containers 44 into position for measurement by positioning them under the sensors 48 within the test chamber. The test chamber will then be lowered, permitting the gasket 40 to seal against conveyor 42.

The central programmer will then close solenoid valve 30 to seal off port 32. It will then open solenoid valve 20 to permit the small holding tank 22 to be charged to the proper operator programmed test pressure. The small holding tank 22 will become increasingly evacuated until the pressure sensor 24 instructs the central programmer 70 that the proper pressure has been reached in the tank. At that point, solenoid valve 20 will be closed by the central programmer and solenoid valve 26 will be opened to evacuate the test chamber 36. During evacuation of the test chamber, pressure sensor 46 will monitor the instantaneous internal pressure of the test chamber and instruct the central programmer accordingly. In addition, each of the multiple sensors 48 supply external signals to their respective signal conditioners for voltage amplification and signal processing.

At the end of the test cycle, the central programmer 70 will first shut off solenoid valve 26. Next, it will open solenoid valve 30 to rapidly exhaust the vacuum from the test chamber 36 and, simultaneously, it will instruct the chamber relays 52 to open the test chamber. This ends the hydraulic pneumatic test for one full cycle and this cycle is repeated over and over for each batch of new containers. After each test cycle, the containers are moved by conveyor from the test chamber and are accepted or rejected by the central programmer 70 from leak rate measurement data stored in the central programmer memory bank.

This invention incorporates a unique error nulling technique to cancel out errors due to container variables that are not controllable by the testing equipment. In this manner the computed leak rate magnitude is not degraded by such uncontrolled variables as internal pressure variations, wall thickness, etc. Containers with different wall thicknesses but identical leak rates will be recorded and computed as identical leak rates even though their wall travel is different. To accomplish this, all physical container variables are classified into four error categories:

1. Initial expansion — this includes all physical parameters that relate to the actual amount of initial expansion or bulge. It includes errors caused by variations in wall thickness, internal container pressure, strength of container, volume variations, modules, material heat treating, contour markings and impact of contour marking dies, and external ambient pressure;

2. Timed related contraction errors — this includes errors due to temperature change during testing, stability of the chamber pressure, stability of chamber position, and stability of test table-top.

3. Starting point errors and non linearity — this includes variations in height of container, orientation and accuracy of container in test stand with respect to sensor position, shape and form factor, wall flatness, uniformity, etc.

4. Dynamic range — because of the enormous spectrum of container variations, measurement instrumentation will have an enormous range of signals to deal with. (It is much easier to detect a 1/1000 inch travel within a working range of 20/1000 inch than to find the same 1/1000 travel in a working range of 1 inch. By confining measurements with a narrow range, system accuracy and speed is tremendously enhanced.

The above broad classes of variables are compensated for by use of a unique error cancelling technique. All measurements made by the sensors are processed by the equation, Leak Rate = $(\Delta LR/tn)/(\Delta LE) \cdot (\Delta LR/tn)$ is defined as the velocity of travel of the container wall towards its initial starting point. $(\Delta LE)$ represents the total amount of expansion in the test chamber due to the change in test chamber pressure. $\Delta LE$ is determined by taking two measurements —1) Shortly after evacuation to avoid initial non-linearities and 2) before maximum expansion to avoid over and under-shoot $(\Delta LR/tn)$ is determined by use of an accurate system clock that instructs a second two-measurement system to record one measurement shortly after the expansion peak to permit settling time and a second measurement at an operator programmable time delay later. Leak rate is then computed automatically and "reads" the same regardless of whether the operator wants a 1/10 second leak measurement or 1 second leak measurement. This technology is radically different in concept from previous leak-bulge technology: in that (1) any attempt to change time in these systems will impact the amount of bulge and also the good-bad reject status; (2) extremely high speed is achieved by dynamic range feed back correction in the summing amplifiers described later. This permits enormous amplification and high speeds without the necessity of handling a very broad signal level range. (3) Finally, leak rate magnitude data is calculated rather than merely indicating an accept/reject status.

In order to detect changes and expansion of the container as small as .0001 inch requires extremely high gain and ultrastable amplification. In order to handle normal container height variations (typically ± 0.2inch) requires measurements that produce signals with an enormous dynamic range (greater than 100db). The manner in which this problem is solved by the present invention will now be described with particular reference to FIG. 3, which illustrates a single container test cycle, taken with each of FIGS. 4–11.

First, referring to FIG. 4. At time A (FIG. 3), the sensor 48 will measure the height of container 44 in an atmosphere of ambient pressure. The resultant signal is amplified by signal conditioner 84 and applied to a summing amplifier 86 having zero feedback correction. The signal is then digitized by an analog to digital converter 88 and the results are stored in memory 90. The contents of memory 90 are transferred to a digital to analog converter 92. The output of this converter represents the starting point, i.e., the required signal correction for dynamic range correction and height variations for that specific container.

Referring now to FIG. 5, the same sensor 48 continues to monitor container height and supplies a signal as before to the summing amplifier 86 by way of the signal conditioner 84. This time, however, feedback correction for dynamic range compression and container height errors are fed from memory 90 through a digital to analog converter 92 and subtracted in the summing amplifier 86. The output of the summing amplifier 86 now represents the starting point for measurement with height corrected and dynamic range compressed.

Figure 6:
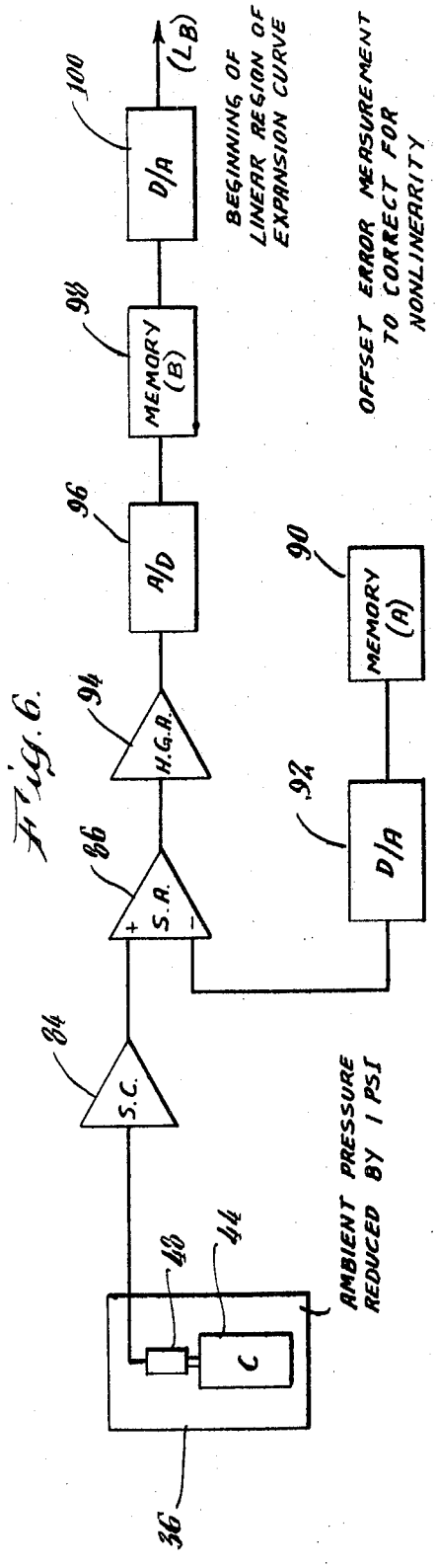

When flexible packages expand, the initial travel may be non-linear, approximately 10% of full scale expansion. To overcome this non-linearity, a measurement is made at time B (FIG. 3) which occurs when the chamber pressure sensor 46 indicates that the ambient pressure in the test chamber has been reduced by 1 psi. Referring now to FIG. 6, it will be noted that the signal is again fed to the summing amplifier 86 along with a feedback correction from memory 90 through the digital to analog converter 92. At this point, the dynamic signal range has been properly compensated and the central programmer 70 switches in a high gain amplifier 94 to take a microscopic look at the expanded container at time B. This highly amplified signal is digitized by analog to digital converter 96, then stored in memory 98 and converted for use in digital to analog converter 100. This is the start of the linear differential pressure expansion curve that is used for reference in expansion calculations.

Figure 7:
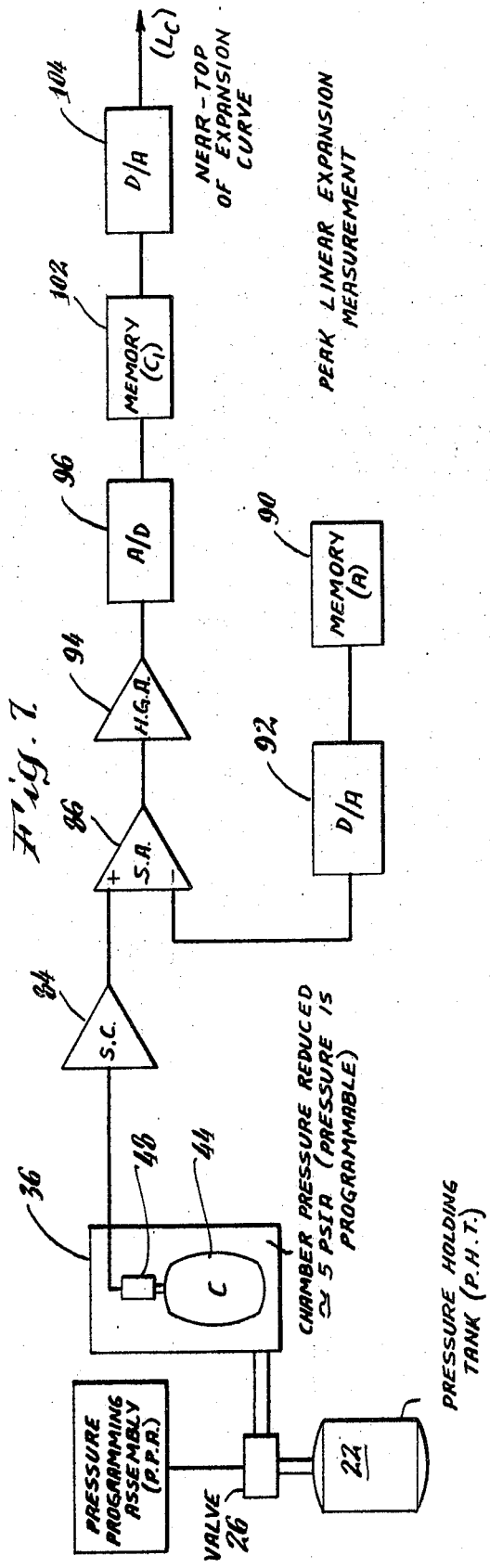

Referring now to FIG. 7, when the test chamber 36 reaches the operator externally programmed test pressure (in this example 5 psia), the new signal from sensor 48 is mixed in the summing amplifier 86 with the feedback signal from memory 90. It is then fed to the high gain amplifier 94 and the highly amplified signal is digitized in analog to digital converter 96 and stored in memory 102. This signal is converted by digital to analog converter 104 for use in the maximum peak expansion calculation. This signal represents the actual expansion at time C.

Reference should now be made to FIG. 8. At time C2 memory 102 and memory 98 are supplied to their respective digital to analog converters and mixed in differential amplifier 106 to calculate the difference $L_C - L_B$. This represents the total differential expansion, $\Delta L_E$. This difference is digitized in converter 108 and is then stored in memory 110 and converted for use in digital to analog convertor 112.

Reference should now be made to FIG. 9. At time D, after the peak pressure overshoot has time to stabilize, the sensor signal is passed to summing amplifier 86 and corrected with data from memory 90. It is amplified by high gain amplifier 94, digitized by the analog to digital converter 96 and stored in memory 114 for further conversion by its respective digital to analog converter 116. This output measurement is called $L_D$. At time $E_1$ another measurement is made in an identical manner, but at a later period in time. The information is digitized and stored in memory 118 and supplied to its respective digital to analog converter 120. This signal is $L_E$.

Reference may now be had to FIG. 10. The data stored in memory 114 and also in memory 118 is not supplied to differential amplifier 122 to calculate $L_D - L_E$ defined as $\Delta L_R$. This value represents the amount of "leak return", that is, the amount of return of the signal to its original point prior to expansion. Since this signal is extremely small, for example .0001 inch, there is switched into operation extremely high gain amplifier 124. This is possible only because of the previous dynamic range compression and height offset correction. The signal $\Delta L_R$ is supplied to a division circuit 126. Also supplied to division circuit 126 is the signal $\Delta L_E$ from memory 110 and the output from clock 127. The division circuit 126 provides an output which is proportional to $\Delta L_R/\Delta L_E/t_n$. This ratio is digitized by analog to digital converter 128, stored in memory 130, and passed on to its respective digital to analog converter 132 for future use.

Reference should now be made to FIG. 11. A signal $\Delta L_E$ stored in memory 110 represents the total linear expansion and is compared in an operator programmable comparator 134 to monitor the gross leak rate. From switches on the operator console 114, the operator programs the leak rate that he considers a gross leak. If the leak rate exceeds the programmed limits, the comparator 134 will turn on the gross leak display lamp 136.

The signal stored in memory 130 represents the actual value of the fine leak rate. This memory content is passed on to its respective comparator 138 which compares this value against operator programmable fine leak rates. If the operator programmed leak rate limits are exceeded by the actual value supplied to the comparator from memory 130, comparator 138 will turn on the leak display lamp 140. If neither of lamp 136, 140 is energized, the logic circuit 142 will turn on a no leak indicator lamp 144. In similar fashion, the comparator and the central programmer unit will operate the accept and reject solenoids 54 for a fine leak reject, no leak accept, and gross leak reject.

Optionally, the data in memory 130 and in memory 110 may be fed to a data acquisition memory 146 and stored in binary form. Alternatively, the same signals may be utilized for analog or graphic recording by taking the outputs from digital to analog convertors 112, 132.

It will now be seen that the present invention operates by calculating the leak rate of a container under vacuum or pressure. The advantage of such an approach is illustrated in FIG. 12, which graphically depicts the expansion of a high strength container and a low strength container. The low strength container expands substantially more under vacuum than does the high strength container and would thus confuse prior art systems. However, the leak rates are identical and the present invention would thus provide identical outputs.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

I claim:

1. The method of testing a sealed container for leaks which comprises: placing said sealed container within a test chamber; changing the pressure within said test chamber over a first time period to a preselected value; measuring a physical dimension of said container at the end of said first time period and producing a first output signal proportional thereto; maintaining said pressure at said preselected value; measuring said physical dimension at the end of a second time period and producing a second output signal proportional thereto; measuring the difference between said first and second output signals and producing a differential signal proportional thereto; and measuring the rate of change of said differential signal and producing a third output signal proportional to the leak rate of said sealed container.

2. In the method of claim 1, measuring said physical dimension prior to said first time period and producing a correction signal proportional thereto; and reducing each of said first and second signals by the amount of said correction signal.

3. The method of testing a sealed container for leaks which comprises: placing said sealed container within a test chamber; changing the pressure within said test chamber over a first time period to a preselected value;

measuring a physical dimension of said container shortly after the beginning of said first time period and producing a first signal proportional thereto; measuring said physical dimension upon attaining said preselected pressure value and producing a second signal proportional thereto; maintaining said pressure at said preselected value for a second time period; measuring the difference between said first and second signals and producing an expansion signal proportional thereto; measuring said physical dimension shortly after attaining said preselected pressure value and producing a third signal proportional thereto; measuring said physical dimension at the end of said second time period and producing a fourth signal proportional thereto; measuring the difference between said third and fourth signals and producing a return signal proportional thereto; dividing said return signal by said expansion signal and producing an output signal proportional to the rate of return of said physical dimension.

4. In the method of claim 3, measuring said physical dimension prior to said first time period and producing a correction signal proportional thereto; and reducing each of said first, second, third, and fourth signals by the amount of said correction signal.

5. The method of testing a sealed container for leaks which comprises: placing said sealed container within a test chamber; measuring a physical dimension of said container and producing a correction signal proportional thereto; changing the pressure within said test chamber over a first time period to a preselected value; measuring said physical dimension shortly after the beginning of said first time period and producing a first signal proportional thereto; subtracting said correction signal from said first signal to produce a corrected first signal; measuring said physical dimension upon attaining said preselected pressure value and producing a second signal proportional thereto; subtracting said correction signal from said second signal to produce a corrected second signal; maintaining said pressure at said preselected value for a second time period; measuring the difference between said corrected first and second signals and producing an expansion signal proportional thereto; measuring said physical dimension shortly after attaining said preselected pressure value and producing a third signal proportional thereto; subtracting said correction signal from said third signal to product a corrected third signal; measuring said physical dimension at the end of said second time period and producing a fourth signal proportional thereto; subtracting said correction signal from said fourth signal to produce a corrected fourth signal; measuring the difference between said corrected third and fourth signals and producing a return signal proportional thereto; dividing said return signal by said expansion signal to produce an output signal proportional to the rate of return of said physical dimension; and comparing said output signal with a preselected standard to determine acceptance or rejection of said container.

6. Apparatus for simultaneously testing a plurality of sealed containers which comprises: a test chamber for receiving said containers; means for changing the pressure in said chamber over a first time period and holding said pressure at a preselected value over a second time period; means within said chamber for measuring a physical dimension of each of said containers and producing a plurality of signals, each proportional to said physical dimension of a different one of said containers; means for sampling each of said signals at preselected times and pressures throughout a test cycle; means for calculating from said signal samples the rate of return of said physical dimension of each of said containers to its original value; means for comparing the rate of return of each of said containers with a preselected rate; and means responsive to said comparing means for indicating the accept/reject status of each of said containers.

7. The apparatus of claim 6 wherein said pressure changing means comprises: an evacuated holding tank; and means for placing said holding tank in fluid flow relationship with said test chamber.

8. The apparatus of claim 6 wherein said sampling means comprises: a first memory connected to receive and store said signal at a time prior to said first time period.

9. The apparatus of claim 6 wherein said holding tank includes a vacuum pump connected to maintain said tank essentially continuously evacuated.

10. The apparatus of claim 9 wherein said placing means comprises: a second holding tank substantially smaller than the first holding tank; and valve means for alternately connecting said second tank to said first tank and to said test chamber.

* * * * *